3,203,921
POLYOLEFIN COMPOSITIONS CONTAINING MINERAL OIL AND MINERAL FILLERS

William J. Rosenfelder, New York, N.Y., assignor to Dublon, Inc., Newark, N.J., a corporation of New Jersey
No Drawing. Filed Oct. 16, 1962, Ser. No. 230,997
15 Claims. (Cl. 260—33.6)

This invention relates to novel resin compositions.

Mineral fillers such as calcium carbonate, silicates, e.g., calcium silicate, and barium sulfate have been previously employed with polyolefins such as polyethylene and polypropylene. However, the fillers have the tendency to make the polyethylene brittle after fluxing. Furthermore, when such fillers are employed with polyethylene, for example, in blow molding, they cause the parison to shrink and curl up and prevent blowing.

When paraffin waxes are added to such filled polyolefins, e.g., polyethylene, they tend to make blow molded articles prepared from the composition even more brittle.

Blow molded polyethylene bodies, e.g., dolls, have an objectionable excess gloss and are waxy in appearance.

It is an object of the present invention to reduce the brittleness of compositions containing a mineral filler and a polymer of a monoolefin having 2 to 3 carbon atoms.

Another object is to reduce the gloss of polyethylene and polypropylene compositions.

An additional object is to prepare more lifelike, duller, less waxy appearing blow molded bodies from polyethylene.

A further object is to reduce the cost of polyethylene and polypropylene compositions.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by preparing a composition containing 10–20% of a mineral filler, 2–7% mineral oil, and the balance, i.e., 73–88% of a solid polymer of a monoolefin having 2 to 3 carbon atoms. The addition of the liquid mineral oil successfully avoids the glossiness of the monoolefin polymer, e.g., polyethylene, and gives blow molded products a more lifelike, duller and less waxy appearance. Furthermore, the mineral oil overcomes the brittleness after fluxing normally caused by the mineral fillers in polyethylene and polypropylene compositions. Additionally, inclusion of the mineral oil eliminates the shrinking and curling of the parison in subsequent blow molding, and it is possible to prepare excellent blow molded articles such as dolls, for example.

In the present specification and claims all parts and percentages are by weight unless otherwise indicated.

As the solid polymer of an olefin having 2 to 3 carbons there are employed homopolymers such as polyethylene and polypropylene, as well as copolymers of ethylene with propylene (e.g., a 50–50 copolymer on a molecular basis) as well as copolymers of ethylene or propylene with a minor amount, e.g., 0.1–30%, of a copolymerizable monoethylenically unsaturated monomer.

There can be employed any of the commercially available polyethylenes, e.g., of high density (0.941–0.970), medium density (0.926–0.940) and low density (0.910–0.925) and commercially available polypropylenes, e.g., of density 0.90–0.91. The polyethylene or polypropylene can be made by any of the conventional procedures such as with Ziegler catalysts or Phillips catalysts; the polyethylene can be made by high or low pressure methods.

There can be employed copolymers of ethylene or propylene with up to 50% of a copolymerizable monoethylenically unsaturated material, e.g., a copolymer of ethylene with 2 to 25% by weight of a lower alkyl acrylate, e.g., ethyl acrylate, 2-ethylhexyl acrylate, hexyl acrylate, decyl acrylate. Also, as copolymerizable materials there can be used vinyl acetate, butylene, vinyl chloride, styrene, and the like. Furthermore, there can be used a mixture of polyethylene and a copolymer of ethylene and 2–25% of an alkyl acrylate as the polymer. Thus, there can be used as the polymer a mixture of 80 to 20% polyethylene and 20 to 80% of a copolymer of ethylene and ethyl acrylate containing 2 to 25% by weight of ethyl acrylate in the copolymer. Suitable examples of such thylene-acrylate copolymers are disclosed in Pecha Patent 2,953,541 and White Patent 2,953,551.

The preferred polymer is polyethylene (i.e., a homopolymer).

As the mineral filler there can be used calcium carbonate, barium sulfate, barium carbonate, calcium silicate, magnesium silicate, aluminum silicate. The preferred filler is calcium carbonate. The mineral filler is normally finely divided and in the specific examples was less than 100 mesh.

The mineral oil normally is of lubricating viscosity. It is primarily aliphatic hydrocarbon in character and at least 80% has a boiling point of at least 300° C., and preferably substantially all of the mineral oil has a boiling point of at least 390° C., although mineral oils boiling at 360–390° C. are also useful. The high boiling mineral oils are preferred because they do not give off any annoying vapors during the fluxing step in the molding operation.

The mineral oil is usually obtained from petroleum sources and, as indicated, is principally aliphatic paraffinic hydrocarbon in nature. Examples of commercially available mineral oils are Nujol and Fractol, each of which has a boiling range of 360–390° C., although the preferred mineral oil is one having a boiling range of 390–525° C. and a specific gravity ranging between 0.800 and 0.905. Mineral oils having a specific gravity as high as 0.94 are also suitable. All boiling points and boiling ranges for the mineral oil are corrected to atmospheric pressure.

Example 1

The formulation contained 80% polyethylene (density 0.960 and melt index 0.2), 16% calcium carbonate (Surfax MM) and 4% mineral oil. The mineral oil was of U.S.P. grade, boiling range 740–975° F. (approximately 390–525° C.) and different cuts of the mineral oil had specific gravities ranging from 0.800–0.905. The composition of the example proved suitable for making blow molded dolls which were free from brittleness. No problems were encountered during the blowing operation. The dolls had a more lifelike, duller and less waxy appearance than similar dolls made from straight polyethylene.

Example 2

The composition of Example 1 was duplicated except that Nujol was employed as the mineral oil. The composition was also suitable for blow molding.

Typical suitable formulations according to the invention are given in the following examples. The materials can be mixed together in any convenient fashion to give the compositions. For example, they can be prepared in a mixer.

Example 3

| | Percent |
|---|---|
| Polypropylene (density 0.91, melt index 0.8) | 80 |
| Calcium carbonate | 16 |
| Mineral oil (B.R. 740–975° F.) | 4 |

Example 4

| | |
|---|---|
| Copolymer of ethylene and ethyl acrylate containing 4% by weight of ethyl acrylate and having a density of 0.92 and a melt index of 4.5 | 80 |
| Aluminum silicate | 16 |
| Mineral oil (B.R. 740–975° F.) | 4 |

Example 5

| | |
|---|---|
| Polyethylene (density 0.925, melt index 20) | 44 |
| Copolymer of ethylene and ethyl acrylate containing 11% by weight of ethyl acrylate and having a density of 0.926 and a melt index of 5 | 36 |
| Calcium silicate | 16 |
| Mineral oil (Nujol) | 4 |

Example 6

| | |
|---|---|
| Polyethylene (density 0.950 and melt index of 2) | 73 |
| Mineral oil (B.R. 740–975° F.) | 7 |
| Calcium carbonate | 20 |

Example 7

| | |
|---|---|
| Polyethylene (density 0.960 and melt index 0.2) | 88 |
| Mineral oil (B.R. 740–975° F.) | 2 |
| Calcium carbonate | 10 |

I claim:

1. A composition consisting essentially of
   (1) 73 to 88% of a member of the group consisting of solid homopolymers of a monoolefin having 2 to 3 carbon atoms and solid copolymers of a monoolefin having 2 to 3 carbon atoms with up to 25% of a copolymerizable monoethylenically unsaturated compound,
   (2) 2 to 7% of a predominantly aliphatic, paraffinic hydrocarbon mineral oil having a boiling point of at least 300° C., and
   (3) 10 to 20% of a mineral filler.

2. A composition consisting essentially of 73 to 88% solid polyethylene homopolymer, 2 to 7% of a predominantly aliphatic, paraffinic hydrocarbon mineral oil having a boiling point of at least 300° C., and 10 to 20% of a mineral filler.

3. A composition according to claim 2 wherein substantially all of the mineral oil has a boiling point of at least 360° C.

4. A composition according to claim 2 wherein the mineral oil has a boiling point of at least 390° C.

5. A composition according to claim 2 wherein the mineral filler is selected from the group consisting of calcium carbonate, barium sulfate, barium carbonate, calcium silicate, magnesium silicate and aluminum silicate and the mineral oil has a boiling point of at least 390° C.

6. A composition consisting essentially of 80% of solid polyethylene homopolymer, 16% calcium carbonate and 4% of a predominantly aliphatic, paraffinic hydrocarbon mineral oil having a boiling point of at least 390° C.

7. A composition consisting essentially of 73 to 88% solid polypropylene homopolymer, 2 to 7% of a predominantly aliphatic hydrocarbon mineral oil having a boiling point of at least 300° C., and 10 to 20% of a mineral filler.

8. A composition according to claim 7 wherein the mineral oil has a boiling point of at least 390° C. and the filler is selected from the group consisting of calcium carbonate, barium sulfate, barium carbonate, calcium silicate, magnesium silicate and aluminum silicate.

9. A composition consisting essentially of (a) 73 to 88% of a solid copolymer of (1) 98 to 75% of ethylene with (2) 2 to 25% of an alkyl acrylate, (b) 2 to 7% of having up to 10 carbon atoms in the alkyl group a predominantly aliphatic, paraffinic hydrocarbon mineral oil having a boiling point of at least 300° C., and 10 to 20% of a mineral filler.

10. A composition according to claim 9 wherein the alkyl acrylate in the copolymer is ethyl acrylate.

11. A compostion according to claim 9 wherein the mineral oil has a boiling point of at least 390° C. and the filler is selected from the group consisting of calcium carbonate, barium sulfate, barium carbonate, calcium silicate, magnesium silicate and aluminum silicate.

12. A composition according to claim 11 wherein the alkyl acrylate in the copolymer is ethyl acrylate.

13. A composition consisting essentially of (a) 73 to 88% of a mixture of (1) 20 to 80% of solid polyethylene homopolymer and (2) 80 to 20% of a solid copolymer of ethylene with 2 to 25% of an alkyl acrylate having up to 10 carbon atoms in the alkyl group, (b) 2 to 7% of a predominantly aliphatic, paraffinic hydrocarbon mineral oil having a boiling point of at least 300° C. and (c) 10 to 20% of a mineral filler.

14. A composition according to claim 13 wherein the alkyl acrylate in the copolymer is ethyl acrylate.

15. A composition according to claim 14 wherein the mineral oil has a boiling point at least 390° C. and the filler is selected from the group consisting of calcium carbonate, barium sulfate, barium carbonate, calcium silicate, magnesium silicate and aluminum silicate.

References Cited by the Examiner

UNITED STATES PATENTS

| | | | |
|---|---|---|---|
| 2,691,647 | 10/54 | Fields et al. | 260—88.2 |
| 2,888,424 | 5/59 | Precopio et al. | 260—41 |
| 2,925,398 | 2/60 | Coran et al. | 260—33.6 |
| 2,953,541 | 9/60 | Pecha et al. | 260—33.6 |
| 2,953,551 | 9/60 | White | 260—33.6 |
| 3,000,866 | 9/61 | Tarney | 260—33.6 |
| 3,081,276 | 3/63 | Snyder et al. | 260—33.6 |

FOREIGN PATENTS

| | | |
|---|---|---|
| 563,347 | 6/58 | Belgium. |
| 881,507 | 11/61 | Great Britain. |

OTHER REFERENCES

Jones et al.: "Properties of Marlex 50 Ethylene Polymer," Industrial and Engineering Chemistry, volume 48, No. 7, July 1956, pages 1155–1161 (page 1160 relied on).

MORRIS LIEBMAN, *Primary Examiner.*